April 16, 1940.  A. S. CAMBRIDGE  2,197,295

MEANS FOR ADJUSTING THE CUTTER BARS OF MOWING MACHINES

Filed June 2, 1939

Inventor,
Allan S. Cambridge
By: Glascock Downing & Seebold Attys.

Patented Apr. 16, 1940

2,197,295

UNITED STATES PATENT OFFICE 2,197,295

MEANS FOR ADJUSTING THE CUTTER BARS OF MOWING MACHINES

Allan S. Cambridge, Dalrachney Station, Omarama, New Zealand

Application June 2, 1939, Serial No. 277,064
In Great Britain July 13, 1938

2 Claims. (Cl. 56—294)

The present invention relates to grass cutting machines often referred to as lawn mowers and more particularly pertains to means for adjusting the angular position of the cutter bar with respect to the revolving helical blades of such machines.

An object of the invention resides in the provision of means for adjusting the angular position of the cutter bar of a lawn mower by the rotation of a handwheel or knob which may be manually turned to effect the adjustment without the aid of separate tools and the invention includes locking means which will automatically retain the knob in the adjusted position.

A further object of the invention resides in providing yieldable means for urging the front edge of the cutter bar towards the helical blade of the mower including adjustable means for restraining such movement of the cutter bar wherein the yieldable means serves to actuate locking means for retaining the restraining means in an adjusted position.

Another object of the invention resides in providing a rigid reinforcement for the rear portion of the frame members of the mower whereby the cutter bar may be adjustably mounted therein without relying on the cutter bar as a part of the reinforcing frame structure.

Other and further features and objects of the invention will be more apparent to those skilled in the art upon a consideration of the accompanying drawing and the following description wherein several exemplary embodiments of the invention are disclosed.

Figure 1:
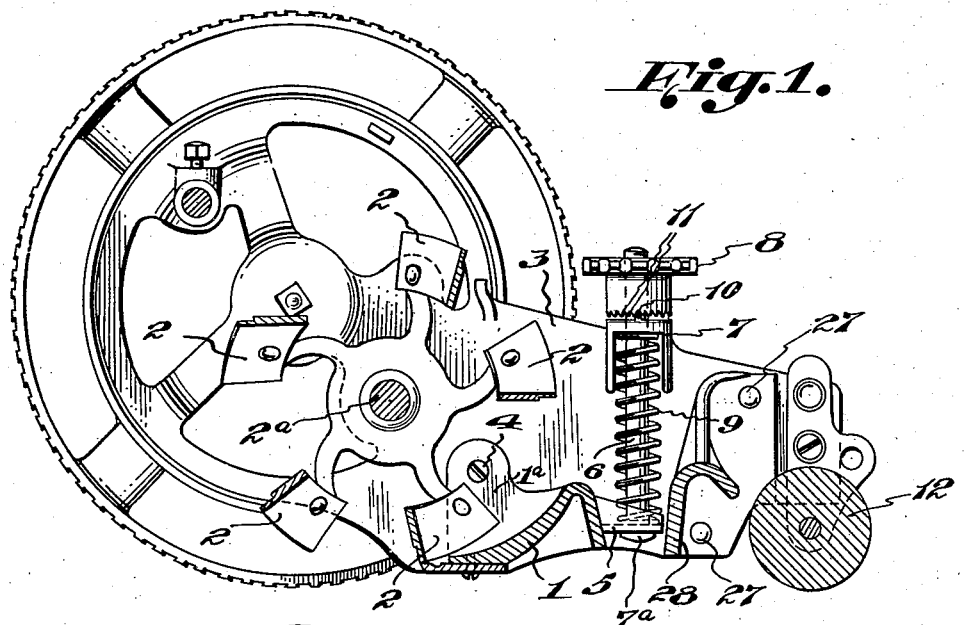
Fig. 1 is a sectional elevational view of a mower illustrating one form of the invention applied thereto.

Referring to the drawing there is shown at 1 a cutter bar provided at the ends thereof with lugs or brackets 1a by means of which the cutter bar is mounted for pivoting movement on the frame members 3 of the mower. The helical blades 2 of the lawn mower are mounted in a conventional manner on spiders which are adapted to be rotated by the shaft 2a. The shaft 2a is driven by the wheels of the lawn mower in a well known manner so that the helical blades 2 cooperate with the cutter bar 1 to perform the cutting operation.

The cutter bar 1 is pivotally mounted on the frame members 3 by means of bolts or screws 4 arranged between the forward or cutting edge and the rear edge of the cutter bar as shown particularly in Figure 1.

The rear edge of the cutter bar 1 or that part nearest the roller 12 is provided with a projection or bracket 5. A bolt 6 is arranged to extend upwardly through the rear edge of the cutter bar 1, preferably through an opening in the projection or bracket 5. The head 7a of the bolt engages the lower surface of the bracket and the upper end of the bolt is provided with threads 10 and this end of the bolt passes freely through a hole in a bracket or lug carried by one of the frame members 3. A hand wheel or knob 8 having a threaded axial opening is mounted to turn on the threads of the bolt 6 above the lug or bracket 7.

Between the lug or bracket 7 and the rear edge of the cutter bar 1, yieldable means such as a coil spring 9 is arranged to embrace the bolt 6. One end of the spring 9 engages the bracket 7, and the other end abuts against the projection 5 carried by the rear edge of the cutter bar 1, so that the spring 9 normally presses the rear edge of the cutter bar 1 downwards, and the forward or cutting edge thus swings upwards with respect to the blades 2. The handwheel 8 is provided with a hub portion having teeth 11 formed in the lower surface thereof to engage a tooth 10 on the bracket 7 of the frame member 3. The spring 9 constantly presses the forward or cutting edge of the cutter bar 1 upwards or towards the blades 2 and the degree of pressure applied by the spring 9 is determined by the extent the bolt 6 is raised by the rotated position of the handwheel 8. Thus by turning the handwheel 8, for example in a clockwise direction and with right handed threads, the rear edge of the cutter bar 1 will be raised to provide the amount of clearance desired between the forward or cutting edge of the cutter bar 1 and the revolving cutters or blades 2. Under the action of the spring 9 the serrations or teeth 11 of the handwheel 8 are urged into engagement with the tooth or teeth 10 of the bracket 7 and the knob 8 will be locked against undesired turning movement, thereby retaining or preserving the adjustment of the cutter bar 1. The cutter bar 1 may therefore be manipulated on the pivots 4 at any time, by clockwise or counter-clockwise rotation of the handwheel 8 to obtain the desired adjustment between the forward or cutting edges of the cutter bar 1, and the revolving cutter blades 2. It will be noted that the spring 9 serves to move the teeth 11 of the handwheel into engagement with the serration 11 of the bracket 7 so as to automatically lock the knob in the adjusted position. The spring 9 in urging the cutting edge of the bar 1 towards the helical blades 2 may yield when a small stone or wire enters between the cutter bar and the blades 2. Such an obstruction would normally deform the cutting edges but injury to these edges is prevented in that the rear edge of the cutter bar may move upwardly against the action of the spring 9 so the cutting edge of the bar may move away from the blades to permit the obstruction to pass therebetween. For this purpose the projection 5 of the cutter bar is movable upwardly on the bolt 6.

It will be understood that the adjusting means described as being arranged at one end of the cutter bar 1 may be provided at both ends thereof. By the use of the adjusting means described, convenient access is obtained to the parts controlling the adjustment, and the locking action is automatic after the desired adjustment has been made.

Figure 2:
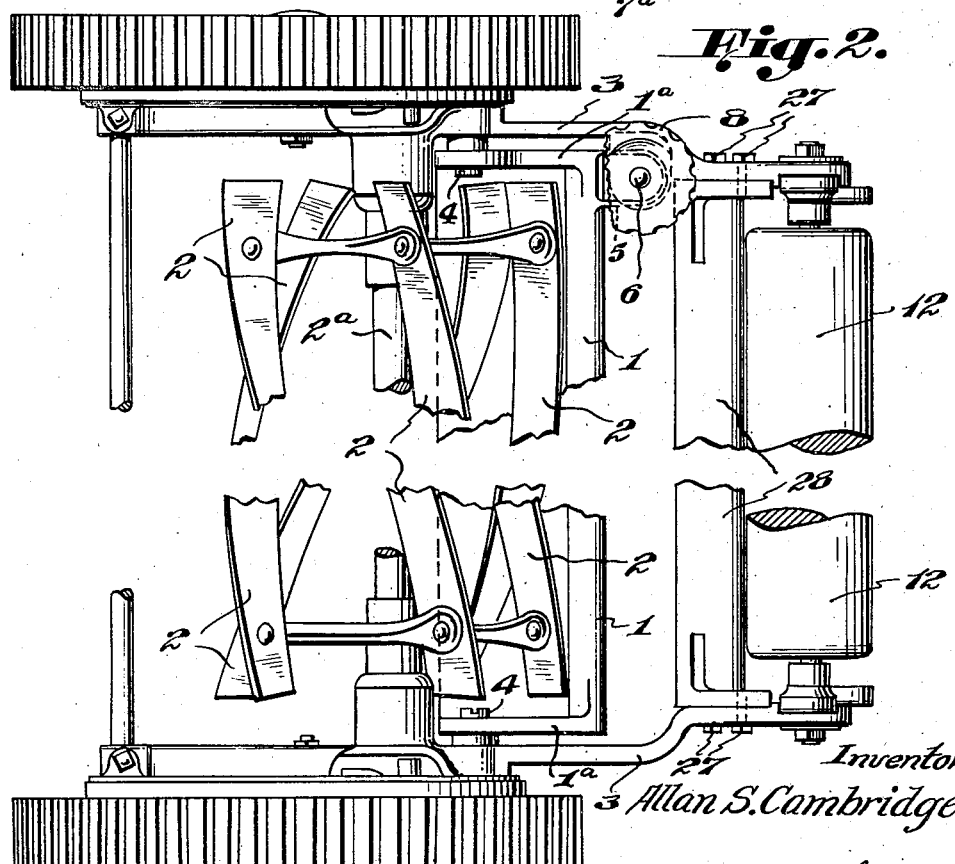
Fig. 2 is a plan view of a mower shown in Fig. 1.

It is essential for the successful operation and use of the adjusting means described, that the frame of the machine be perfectly rigid so as to prevent twisting thereof and for this purpose the frame is braced or stiffened by a cross bar 26 of suitable section located in front of the roller 12 as shown in Fig. 2. The cross bar 26 is preferably secured to the frame members 3 by means of bolts 27 so that the rear end of the mower frame is sufficiently rigid to prevent twisting thereof without relying on the cutter bar as means for reinforcing the frame. The rear portion of the frame may thus be regarded as being U-shaped and providing a unitary cage within which the cutter bar and the adjusting means are mounted.

While the invention has been described with reference to specific constructional details it is to be understood that changes may be made therein by those skilled in the art. Such modifications may be made without departing from the spirit and scope of the invention as set forth in the appended claims.

I claim:

1. In a mowing machine, a frame, a bar having a front cutting edge and a rear edge pivotally mounted intermediate said edges on the frame, a reel having a plurality of cutting blades mounted for rotation adjacent said bar, a projection having an opening therein carried by the rear edge of the bar, a bracket fixed to the frame, a bolt extending freely through said opening and terminating adjacent said bracket, a head carried by the bolt engaging said projection, a spring interposed between said projection and said bracket, a hand wheel threaded on said bolt and engaging said bracket for compressing the spring, at least one tooth carried by the bracket, said handwheel having grooves arranged to receive said tooth, and said spring being adapted to move the grooves into engagement with said tooth.

2. In a mowing machine, a frame, a bar having a front cutting edge and a rear edge pivotally mounted on the frame, a reel having a plurality of cutting blades mounted for rotation adjacent said bar, a bracket carried by the frame, a bolt extending from the bar and terminating adjacent said bracket, a spring interposed between said bar and said bracket, a hand wheel threaded on said bolt and engaging said bracket for compressing the spring, a tooth carried by the bracket extending longitudinally of the bolt, said handwheel having grooves arranged to receive said tooth, and said spring being adapted to move the grooves into engagement with said tooth.

ALLAN S. CAMBRIDGE.